Aug. 24, 1937.  H. GOLDEN  2,091,227
STEERING STABILIZER
Filed July 15, 1936

INVENTOR
HARRY GOLDEN
BY C. James Cottrell
ATTORNEY

Patented Aug. 24, 1937

2,091,227

UNITED STATES PATENT OFFICE 2,091,227

STEERING STABILIZER

Harry Golden, New York, N. Y., assignor to Magna Products Corporation, New York, N. Y., a corporation of New York Application July 15, 1936, Serial No. 90,647

2 Claims. (Cl. 280—89)

This invention relates to stabilizing devices; and more particularly to devices which automatically function to retain the steering wheel, or wheels in their intended positions of adjustment during the running of an automobile.

It is an object of this invention to provide a device for eliminating undesirable vibratory shaking or swerving of the front wheels of an automobile, which is not uncommon in steering gear after it has become somewhat worn or the structure of the automobile, from overload or otherwise, is improperly balanced.

Devices of this character heretofore produced have been designed for adjustment between steering tie rods and axles on the same level. This is objectionable in that in many of the automobiles of the new type, the axle and tie rod or drag link are not on the same level, and consequently, such stabilizers can be used only after considerable bending or distorting. Inasmuch as steering stabilizers are in most instances installed by the operator or the accessory dealer, tools for bending or distorting are not available, and in any case the installing of the stabilizer is obviously inconvenient and unsatisfactory.

It is a further object of this invention to provide a steering stabilizer which can be readily and conveniently adjusted for height, that is for axles and tie rods on different levels as well as for axles and ties rods on the same level.

These and other objects are attained by the novel construction, combination and arrangement of parts hereinafter described and shown in the accompanying drawing, constituting a material part of this disclosure, and in which.

Figure 1:
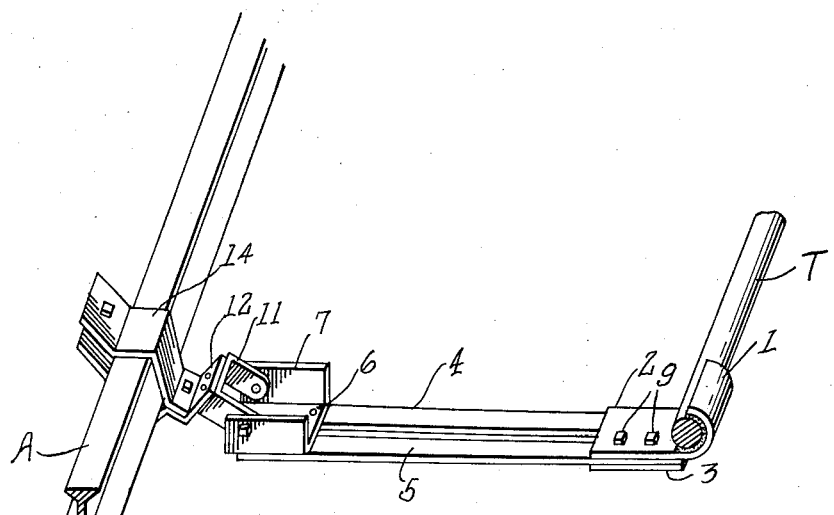
Fig. 1 is a perspective view of a steering stabilizer embodying my invention.
Figure 2:
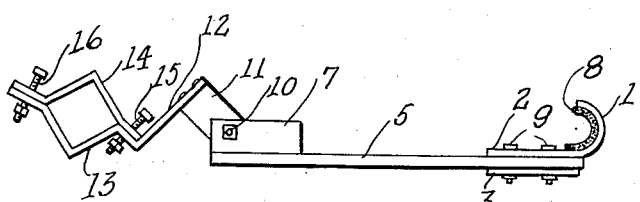
Fig. 2 is a side elevational view of the steering stabilizer.

Referring to drawing, the steering stabilizer is shown to include an arcuate shoe 1 which embraces a tie rod T, connected with the steering apparatus. The shoe 1 is preferably lined with a friction material 8, such as brake lining or similar material. Shoe 1 is integral with a plate 2 which cooperates with a lower plate 3 to clamp the shoe adjustably to spaced bars 4 and 5. By loosening bolts and nuts 9, the plates 2 and 3 can be adjustably positioned at various points along the bars 4 and 5 to compensate for various distances between the axle A and tie rod T on different styles of automobiles.

Bars 4 and 5 are attached to a channel member 6 having side walls 7 to which are pivotally attached by means of bolts and nuts 10 a U-shaped member 11, which is fixed to a plate 12 integral with a V-shaped clamping member 13, the latter cooperating with a similar V-shaped clamping member 14. By means of bolts and nuts 15 and 16, the clamping members can be secured to axles A of various sizes, whether the axle be round or I-shaped.

From the above description, it will be seen that I have provided a simple and relatively inexpensive structure for attaching to axles and tie rods on different levels as well as axles and tie rods at different distances apart. To adjust for different levels, it is only necessary to loosen bolts and nuts 10 so that the U-shaped member 11 can be rotated to the proper angle, after which the bolts and nuts 10 are tightened to maintain the member 11 in such position. This enables the clamping members 13 and 14 to properly engage the axle A. The bars 4 and 5 can then remain horizontally disposed so that the shoe 1 will properly engage the tie rod at all times.

The foregoing disclosure is to be regarded as descriptive and illustrative only, and not as restrictive or limitative of the invention, of which obviously an embodiment may be constructed including modifications without departing from the general scope herein indicated and denoted by the appended claims.

Having thus described my invention, what I claim as new and desire to secure by Letters Patent, is:

1. A steering stabilizer, comprising a plate having integral therewith an arcuate shoe adapted to engage the tie rod of a steering gear, a member adjustably connected to the plate, a first U-shaped member attached to said member, a second U-shaped member pivotally connected to the first U-shaped member, and V-shaped clamping members supported by the second U-shaped member.

2. A steering stabilizer, comprising a plate disposed substantially perpendicular to the ground and adapted to engage the tie rod of a steering gear, a pair of horizontally disposed bars adjustably connected to said plate, a channel member attached to said bars, a U-shaped member having the legs thereof pivotally connected to the side walls of the channel member, and a pair of V-shaped clamping members supported by said U-shaped member.

HARRY GOLDEN.